Oct. 5, 1965 P. D. JONES 3,210,605
ALTERNATING CURRENT OVERLOAD PROTECTION CIRCUITS
Filed Nov. 5, 1962
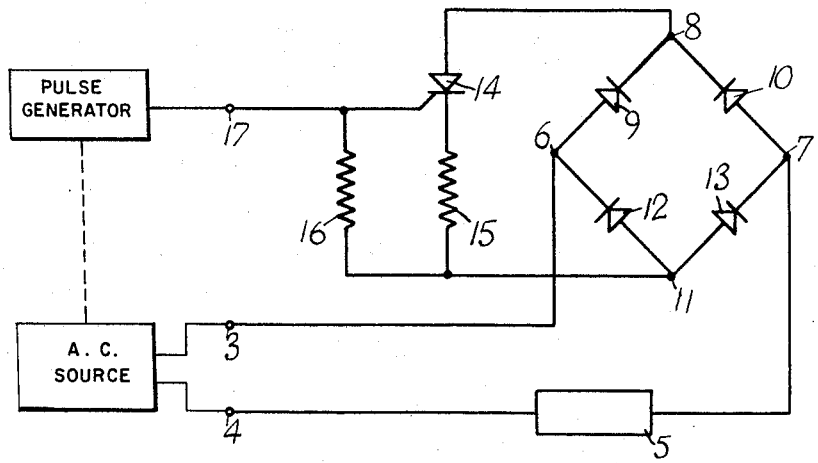

United States Patent Office 3,210,605
Patented Oct. 5, 1965

3,210,605
ALTERNATING CURRENT OVERLOAD
PROTECTION CIRCUITS
Peter David Jones, Hodgehill, Castle Bromwich, Birmingham, England, assignor to Joseph Lucas (Industries) Limited, Birmingham, England
Filed Nov. 5, 1962, Ser. No. 235,265
Claims priority, application Great Britain, Nov. 22, 1961, 41,735/61
4 Claims. (Cl. 317—33)

The object of this invention is to provide an A.C. overload protection circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674.

A protection circuit in accordance with the invention comprises in combination a pair of supply terminals adapted for connection to an A.C. source, a full-wave bridge rectifier having a pair of input terminals connected to the supply terminals through a load and a pair of output terminals interconnected through the anode and cathode of a switchable rectifier, a resistor in the cathode circuit of the switchable rectifier, and resistance means connecting the gate of the switchable rectifier to the same output terminal of the bridge rectifier as the cathode, the gate being adapted for connection to a source of pulses, and the arrangement being such that when the current flow in the resistor exceeds a predetermined value, the switchable rectifier will be cut off, thereby preventing further current flow in the load.

The accompanying drawing is a circuit diagram illustrating one example of the invention.

Referring to the drawing, there are provided first and second supply terminals 3, 4, adapted for connection to an A.C. source, and connected through a load 5 to the input terminals 6, 7 of a full-wave bridge rectifier. The latter includes a first output terminal 8 connected to the input terminals 6, 7 through diodes 9, 10 respectively, and a second output terminal 11 connected to the input terminals 6, 7 through diodes 12, 13 respectively.

The terminal 8 is connected to the anode of a switchable rectifier 14 having its cathode connected to the terminal 11 through a resistor 15. The gate of the switchable rectifier is connected to the terminal 11 through a resistor 16, which may be replaced by a Zener diode, and is connected to a terminal 17 adapted for connection to a pulse source conveniently derived from the A.C. source.

During alternate half-cycles the current flow is from terminal 3 to the terminal 4 through the diode 9, the switchable rectifier 14, the resistor 15 and the diode 13. During intervening half cycles current flows from the terminal 4 through the diode 10, the switchable rectifier 14, the resistor 15 and the diode 12 to the terminal 3. The switchable rectifier is switched on at a point in each half-cycle dependent upon when the triggering pulses are received.

However, if during a half-cycle the current flowing in the resistor 15 exceeds a predetermined value the switchable rectifier will automatically be cut off, since its gate is held at a substantially constant potential by the resistor 16 or Zener diode.

Having thus described my invention what I claim as new and desire to secure by Letters Patent is:

1. An A.C. overload protection circuit comprising in combination an A.C. source, a full wave bridge rectifier having a pair of output terminals and a pair of input terminals, a load through which said input terminals are connected to the A.C. source, a switchable rectifier having its anode connected to one of the output terminals, a resistor through which the cathode of the switchable rectifier is connected to the other output terminal, resistance means connecting the gate of the switchable rectifier to said other output terminal, and a pulse generator connected to the gate of the switchable rectifier, said switchable rectifier being switched on by pulses received from the pulse generator, but being switched off when the current flowing in said resistor exceeds a predetermined magnitude.

2. A circuit as claimed in claim 1 in which said resistance means is constituted by a resistor.

3. A circuit as claimed in claim 1 in which said resistance means is constituted by a Zener diode.

4. A circuit as claimed in claim 1 in which said pulse generator is driven by the A.C. source.

No references cited.

SAMUEL BERNSTEIN, *Primary Examiner.*